United States Patent [19]
Harned

[11] 4,012,942
[45] Mar. 22, 1977

[54] BORDERLINE SPARK KNOCK DETECTOR
[75] Inventor: John L. Harned, Grosse Point Woods, Mich.
[73] Assignee: General Motors Corporation, Detroit, Mich.
[22] Filed: May 17, 1976
[21] Appl. No.: 686,643
[52] U.S. Cl. .............................. 73/35; 123/117 R; 123/146.5 A
[51] Int. Cl.² ........................................ G01L 23/22
[58] Field of Search ........... 73/35, 116; 123/119 R, 123/119 ED, 146.5 A, 117 R

[56] References Cited
UNITED STATES PATENTS 3,950,981  4/1976  Arrigoni et al. ...................... 73/35

Primary Examiner—James J. Gill
Attorney, Agent, or Firm—Warren D. Hill

[57] ABSTRACT

Spark knock in an internal combustion engine is detected by an accelerometer attached to the intake manifold which generates electrical signals representing inaudible background engine noise combined with knock. A signal proportional to engine speed is provided and a circuit responsive to the speed signal generates a background noise reference signal which is subtracted from the electrical signal therefore producing a knock intensity signal. That signal is in turn compared with another speed variable reference signal representing borderline knock level so that the resultant output is a signal representing the amount by which the knock intensity exceeds the borderline value. Each reference signal is generated by a diode function generator in response to the speed signal.

3 Claims, 1 Drawing Figure

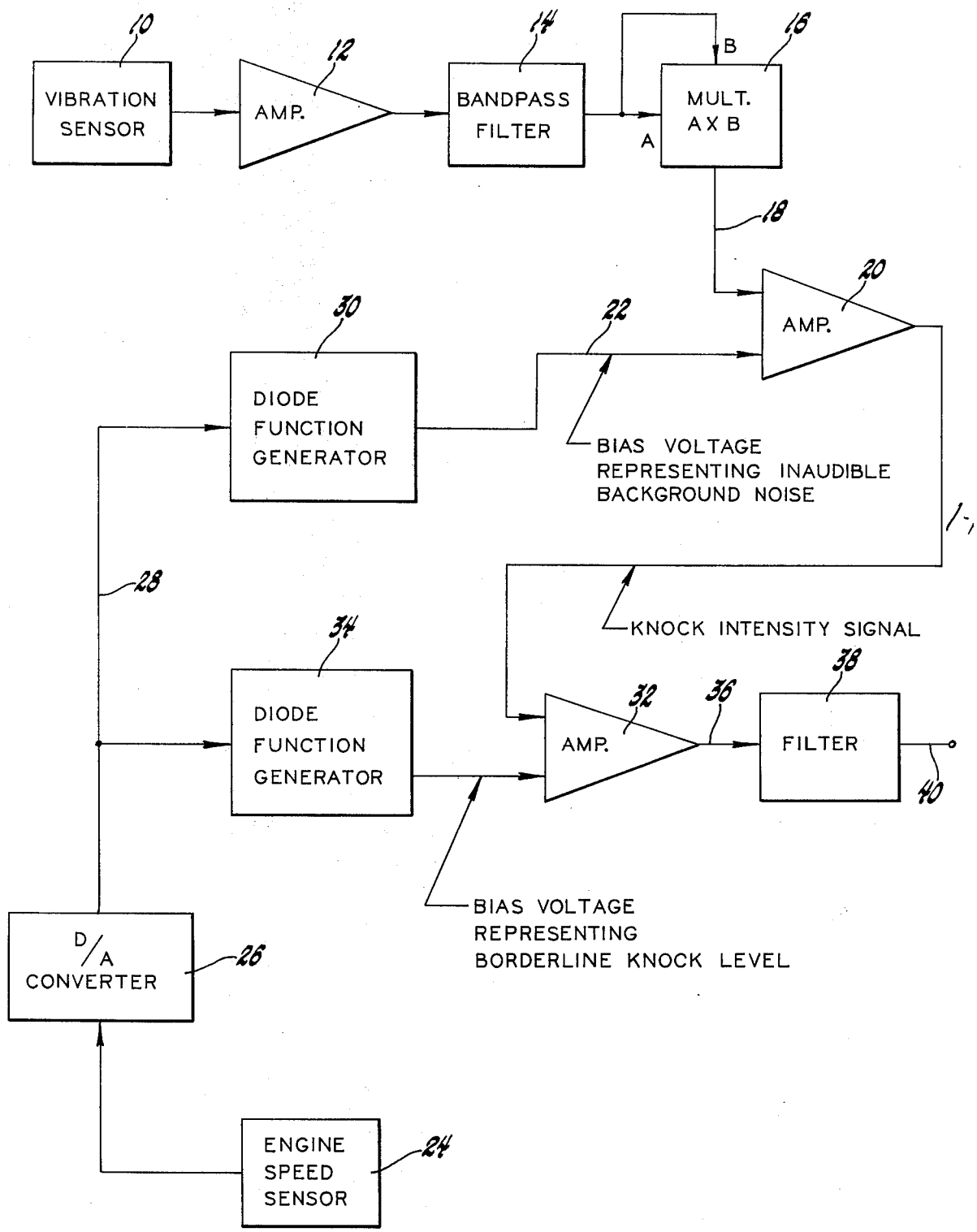

BORDERLINE SPARK KNOCK DETECTOR

This invention relates to a borderline spark knock detector for spark ignition internal combustion engines.

In order to improve internal combustion engine efficiency and performance, it has been proposed to control the engine spark timing in accordance with engine operating parameters in order to adjust the spark timing to its optimum value. One of the chief parameters to be considered in such control systems is borderline spark knock. A spark knock in spark ignition engines produces a characteristic pinging sound that is audible to the human ear if the knock intensity is high enough. Borderline knock is defined as a knock intensity level at which the pinging sound is barely discernible to the trained ear of a person riding within the vehicle.

The purpose of a control system utilizing a knock detector is not to eliminate knock. To the contrary, engine performance suffers when knock is eliminated; thus at least to some extent, it is desirable to have knock present. On the other hand audible knock is aesthetically objectionable. It is thus desirable to control engine operation so that knock is allowed, particularly at wide open throttle conditions but it is not permitted to become loud enough to be heard by the vehicle occupant. Thus the borderline knock level represents the maximum allowable spark knock intensity.

The boarderline knock intensity will depend upon how well the trained ear can perceive the knock during conditions of vehicle travel where the variable sounds from other sources such as the tires, vehicle wind noise and the engine tend to mask the pinging sound. Thus the borderline knock cannot be determined merely by comparing a measured knock intensity to a fixed value. It has been proposed to measure knock intensity by transducers mounted on the engine structure to provide electrical signals representing engine vibrations and then somehow compensating for engine background noise which is not caused by knock. Previous attempts at such compensations have commonly employed a method of averaging or integrating the transducer signal to simulate background engine noise and subtracting the average value from the signal in the expectation that the resulting difference will represent the knock intensity. Such systems have not been satisfactory. Where there is heavy knock at high speeds, the average value may equal the low signal value so that the difference is zero, which is obviously in error.

It is therefore a general object of the invention to provide a borderline knock detector which properly compensates for variations in audible background noise.

It is another object to provide in such a spark knock detector an improved compensation for inaudible engine background noise in an engine transducer signal.

The invention is carried out by providing a circuit for electrically sensing the level of knock vibrations produced in an engine, a circuit responsive to engine speed to generate a signal representing borderline knock level, and an amplitude discrimination circuit for comparing the knock level with borderline knock values to determine when the knock intensity exceeds a borderline knock level. The invention further contemplates a circuit for generating an engine background noise reference as a function of engine speed for use in the circuit sensing the knock level.

The above and other advantages will be made more apparent from the following specification taken in conjunction with the accompanying drawing which is a block diagram of the borderline spark detector according to the invention.

As shown in the drawing, a sensor 10 comprising an accelerometer such as a piezoelectric transducer is mounted on a vehicle engine, not shown, to detect engine vibrations. It is preferred that the sensor be attached to the engine intake manifold. The sensor output signal then is an electrical representation of the engine vibration which is caused by spark knock and by other noise sources referred to herein as engine background noise. The engine background noise detected by the sensor 10 is generally not audible whereas the spark knock is not necessarily audible but may reach audible levels. The vibration signal from the sensor 10 is fed to an amplifier 12 and then passed through a bandpass filter 14 that suppresses frequencies outside a 5,000 to 10,000 Hz band width. The low frequencies are suppressed to remove extraneous signals such as those caused by engine roughness whereas the high frequencies are suppressed to remove undesirable signals such as those caused by resonance of the sensor 10 and RF noise induced in the sensor output circuitry.

In order to improve the signal-to-noise ratio, the filtered vibration signal is squared by feeding it to two inputs of a multiplying circuit 16. The squared output on line 18 is then fed to one input of a differential amplifier 20. The second input to the amplifier 20 on line 22 is a bias voltage proportional to the background noise component of the squared vibration signal on line 18. It has been found that the background noise sensed by the sensor 10 is a predictable function of engine speed. Accordingly, the bias voltage on line 22 can be derived from a speed signal.

A speed sensor 24 generates a frequency proportional to engine speed. That frequency can be provided by an engine distributor output or a magnetic pickup excited by a toothed wheel attached to a harmonic pulley. A digital-to-analog converter 26, response to the pulsed output of the sensor 24, generates an output DC voltage level on line 28 proportional to engine speed. The engine speed signal on line 28 then is fed to a diode function generator 30 which produced a bias voltage on line 22 which is proportional to the background noise component on the signal on line 18. That bias voltage is empirically determined as a function of speed for a particular engine model. The characteristic bias function will vary from one engine to another depending upon sensor design and location. The bias level is selected to suppress the majority of the background noise but allow a small amount of such noise to pass through the amplifier 20 so as not to excessively attenuate the knock signal.

The resulting knock intensity signal is fed to an input of a differential amplifier 32 which has a second input connection to a diode function generator 34 which is responsive to the engine speed signal on line 28. The diode function generator 34 provides a bias voltage proportional to borderline knock level as empirically determined for a given engine model and vehicle model. Since the borderline knock level depends upon perception of knock noise by one riding in the vehicle, the vehicle structure and the type of engine will greatly effect the knock intensity level that can be heard in the vehicle above the audible engine background noise as well as vehicle noise caused by wind and tires, for example. Since the most severe knocking condition occurs at wide open throttle and is most easily heard at low vehicle speeds, the empirical determination of the diode function generator characteristic is made under those conditions.

Even though the optimum borderline knock level would be a function of vehicle speed as well as engine speed, it has been found that a borderline knock signal generated on the basis of engine speed gives good practical results with respect to engine performance and audible knock control. The output of amplifier 32 provides on line 36 a signal representing the amount by which the knock intensity signal from amplifier 20 exceeds the borderline knock signal from diode function generator 34. That signal on line 36 will be pulsed DC signal representing audible knock events and the amplitude of that signal indicates the loudness of the events and the frequency of pulses represents the frequency of the knock events.

A low pass filter 38 provides an output signal on line 40 representing the product of the knock intensity, duration and frequency as a DC level which is useful as evaluation information or as a control input to a spark timing device. The filter 38 preferably has a time constant of 0.1 second to provide a statistical average over many knock events (when knocking conditions are present) and yet provide fast changes with knock conditions.

It will thus be seen that a simple inexpensive circuit according to this invention can detect the presence of borderline knock and provide an output representative of the degree of knock intensity above a borderline value. It will further be seen that a number of alterations to the specific embodiment described here may be made within the scope of the invention. For example, the multiplier circuit 16 can be omitted at the expense of signal-to-noise ratio; and the diode function generator 30 and 34 could be combined into one unit so that the signal on line 22 is proportional to the sum of the background noise signal and the borderline knock level thereby rendering amplifier 32 unnecessary.

The embodiments of the invention in which an exclusive property of privilege is claimed are defined as follows:

1. A borderline knock detector for a spark ignition internal combustion engine comprising
   means for sensing engine vibrations arising from engine knock exclusive of engine background inaudible noise and for providing a corresponding electrical vibration signal,
   means effective to produce a reference signal in response to engine speed and simulating background audible noise including both engine noise and vehicle noise, whereby the value of the reference signal corresponds to the borderline audible knock level for that speed, and
   an amplitude discrimination circuit responsive to the difference between the electrical vibration signal and the reference signal to provide an output signal when knock intensity exceeds borderline audible knock level.

2. A borderline knock detector for a spark ignition internal combustion engine comprising
   means for sensing engine vibrations arising from engine knock and engine background noise and for providing a corresponding electrical vibration signal,
   means effective to produce a first reference signal in response to engine speed simulating engine inaudible background noise,
   a first amplitude discrimination circuit responsive to the difference between the electrical vibration signal and the first reference signal to provide a knock intensity signal,
   means effective to produce a second reference signal in response to engine speed and simulating background audible noise including both engine noise and vehicle noise, whereby the value of the second reference signal corresponds to the borderline audible knock level for that speed, and
   a second amplitude discrimination circuit responsive to the difference between the knock intensity signal and the second reference signal to provide an output signal when knock intensity exceeds the borderline audible knock level.

3. A borderline knock detector for a spark ignition internal combustion engine comprising
   a vibration transducer secured to an engine manifold for sensing engine vibrations arising from engine knock and engine background noise and for providing a corresponding electrical vibration signal,
   means for providing a signal proportional to engine speed,
   a first diode function generator responsive to the engine speed signal for providing a first reference signal equivalent to the engine background noise component of the electrical vibration signal,
   a first differential amplifier responsive to the difference between the first reference signal and the electrical vibration signal to provide a knock intensity signal,
   a second diode function generator responsive to the engine speed signal for providing a second reference signal representing background audible noise including both engine noise and vehicle noise whereby the value of the second reference signal corresponds to the borderline audible knock level for that speed, and
   a second differential amplifier responsive to the difference between the second reference signal and the knock intensity signal to provide an output signal when knock intensity exceeds the borderline audible knock level.

* * * * *